United States Patent
Levchik et al.

(10) Patent No.: US 8,026,303 B2
(45) Date of Patent: Sep. 27, 2011

(54) HALOGEN-FREE FLAME RETARDANT COMPOSITIONS, THERMOPLASTIC COMPOSITIONS COMPRISING THE SAME AND METHODS OF PRODUCING THE COMPOSITIONS

(75) Inventors: Sergei V. Levchik, Croton-on-Hudson, NY (US); Gerald R. Alessio, Emerson, NJ (US); Oiang Yao, League City, TX (US)

(73) Assignee: ICL-IP America Inc., Ardsley, NY (US)

( * ) Notice: Subject to any disclaimer, the term of this patent is extended or adjusted under 35 U.S.C. 154(b) by 0 days.

(21) Appl. No.: 12/087,377

(22) PCT Filed: Jan. 5, 2007

(86) PCT No.: PCT/US2007/000444
§ 371 (c)(1),
(2), (4) Date: May 15, 2009

(87) PCT Pub. No.: WO2007/081904
PCT Pub. Date: Jul. 19, 2007

(65) Prior Publication Data
US 2010/0010128 A1    Jan. 14, 2010

(51) Int. Cl.
*C07F 9/09*    (2006.01)
*B29C 33/60*    (2006.01)
*C08K 5/51*    (2006.01)
*C08K 5/52*    (2006.01)
*H01B 3/44*    (2006.01)
*C08C 19/02*    (2006.01)

(52) U.S. Cl. ........ 524/127; 524/136; 524/139; 524/143; 524/145; 524/147

(58) Field of Classification Search .................. 524/127, 524/140, 136, 143, 145, 147
See application file for complete search history.

(56) References Cited

U.S. PATENT DOCUMENTS

| 6,150,443 | A | * | 11/2000 | Nodera et al. | ................ 524/157 |
| 6,642,288 | B1 | * | 11/2003 | Hulskotte | ..................... 524/100 |

FOREIGN PATENT DOCUMENTS

| EP | 0356633 | 3/1990 |
| EP | 0356634 | 3/1990 |
| EP | 0522653 | 1/1993 |
| EP | 0538950 | 4/1993 |

* cited by examiner

*Primary Examiner* — Harold Pyon
*Assistant Examiner* — Atnaf Admasu
(74) *Attorney, Agent, or Firm* — Dilworth & Barrese, LLP.

(57) ABSTRACT

The present invention relates to a halogen-free or substantially halogen-free flame-retardant composition comprising a blend of (i) at least one of each highly charring polymer (ii) at least one low volatility phosphate ester, and (iii) at least one compound which splits off a high volatility phosphorus-containing fragment. The invention also relates to a flame retarded thermoplastic composition wherein the flame retardant composition is blended with at least one thermoplastic resin (iv), preferable a polystyrene resin. The invention also relates to a process for manufacturing a flame retardant composition and a thermoplastic composition containing the same.

32 Claims, No Drawings

HALOGEN-FREE FLAME RETARDANT COMPOSITIONS, THERMOPLASTIC COMPOSITIONS COMPRISING THE SAME AND METHODS OF PRODUCING THE COMPOSITIONS

FIELD OF THE INVENTION

This invention relates to halogen-free or substantially halogen free flame retardant compositions and flame-retarded thermoplastic compositions containing the same. In particular, the present invention relates to flame retardant compositions that are halogen-free or substantially halogen-free and comprise a blend of (i) at least one high charring polymer, (ii) at least one low volatility phosphate ester and (iii) at least one compound which splits off a high volatile phosphorus-containing fragment. The invention is also directed to thermoplastic flame retarded compositions comprising the aforementioned flame-retardant compositions blended with at least one thermoplastic resin, preferable a polystyrene resin, and methods to produce the same.

BACKGROUND OF THE INVENTION

A common practice for producing thermoplastics having flame retardant characteristics is to incorporate halogenated compounds. More specifically, aromatic polybrominated compounds have been used as flame retardant additives in such thermoplastic resins. A synergist, which is typically a metal oxide, is applied in combination with the polybrominated compound to achieve better flame retardant characteristics. It is generally accepted that these products inhibit radical gas phase reactions occurring in the flame when ignited. Accordingly, halogenated flame retardants are very commonly used additives for different types of polymeric materials. However, during the last fifteen years or so, halogenated flame-retardants have come under greater scrutiny and some of them have been banned from use because of ecological concerns. At this time, the flame retardant industry is under pressure to change to flame-retardant additives which are more environmentally friendly.

Phosphorus containing products are logical substitutes for such halogenated flame-retardants. In some applications, phosphorus containing additives show at least as much activity as the halogenated ones, although the phosphorus containing additives are less commonly employed. These phosphorus containing additives may provide flame retardant activity through a combination of condensed phase and gas phase reactions (E. D. Weil, W. Zhu, N. Patel and S. M. Mukhopadhyay, Polymer Degradation and Stability, 1996, vol. 54, pp. 125-136). The phosphorus containing products are able to react with the polymer during combustion and increase its carbonization while reducing the production of volatile combustible gases. These processes obviously depend on the polymer in which such additive(s) are used. Therefore, specific phosphorus containing structures must be tailored for each type of polymer. The gas phase action of the phosphorus containing additives is more generic; since it does not depend on the polymer type.

The description of the use of a combination of two or more phosphorus containing flame retardant additives in thermoplastic resins is relatively extensive in the prior art. For example, U.S. Pat. Nos. 4,257,931 and 5,814,690, (the contents of each are herein incorporated by reference) Great Britain Patent Publication No. 2,330,583, German Patent Publication No, 44,26,010, French Patent Publication No. 2,781,807, Japanese Patents Nos. 10,287,761, 10,316,813, 11,116,817, 11,181,199 and 11,302,656, European Patent Publications Nos. 897,413, 896,023, 899,296 and 947,560, and PCT International Patent Publications Nos. WO 98/39 381, WO 98/53 002, WO 99/27 016 and WO 99/28 382 all describe combinations of two or more phosphorus containing flame retardants.

However, the combinations disclosed in the prior art use relatively large amounts of such phosphorus containing additives. Some of these additives have limited solubility in polymers, especially in semi-crystalline polymers and therefore tend to migrate to the polymer surface. This migration phenomenon adversely affects the surface appearance and the combustion performance of the polymer product. If the phosphorus-containing additive or combinations of additives are soluble in the polymer, they tend to plasticize the polymer and reduce the thermal properties, such as, heat distortion temperature of the polymer. Numerous attempts to rectify these problems by copolymerization of phosphorus containing units into the polymer chains have been attempted but have only had low to moderate commercial success (see, for example, E. D. Weil, Phosphorus-Containing Polymers, in the Kirk-Othmer Encyclopedia of Polymer Science and Engineering", Vol. 11, John Wiley, New York, 1990, pp. 96-126). The reason these compounds were not commercially successful was because of their high cost and a decrease in the physical properties of the resulting polymer composition.

Another approach described in the prior art relates to the combination of a high charring polymer and a phosphorus-containing additive, which is normally compatible with the high charring polymer. For example, U.S. Pat. No. 6,569,928, the contents of which are herein incorporated by reference, describes the use of a high charring polymer that contains benzene rings in the main polymer backbone in combination with phosphorous containing additives. This combination of additives is applied to a semi-crystalline polyester, which prevents migration of the phosphorus-containing additive to the surface as compared to when the phosphorous containing additive is used without combining it with a high charring polymer. However, the flame retardant compositions described in this patent are limited to polyesters and the organic additive must have benzene rings incorporated directly into the backbone of the organic phosphate. Relatively high concentrations of the flame retardant is also required and therefore do not make the composition a commercial alternative to other existing products on the market.

Still another approach described in the prior art relates to the combination of a high charring polymer with metal alkyl-alkyl phosphonate as a flame retardant. For example, European Patent Publication No. 0,356,634 describes the use of high-impact polyphenylene ether comprising aluminum-methyl-methyl phosphonate as the flame retardant and a fatty acid having 12-20 carbon atoms or a salt thereof. The fatty acid is used to increase the impact strength of articles manufactured from the resulting composition without significantly influencing the flame retardant properties of the manufactured article. This European patent further discusses optionally intensifying the flame retarding activity of the fatty acid containing composition by adding a tetra-arylphenylene diphosphate.

U.S. Pat. Nos. 6,258,879 and 6,486,244, the contents of each are herein incorporated by reference, disclose a process for manufacturing concentrates of polyphenylene ether resin and an organic phosphate. This concentrate is eventually ground to a powder containing less than 5% by weight of particles less than about 75 micrometers in size. This grinding process helps to decrease the amount of energy required for compounding and avoids the explosion risk associated with the handling of potentially airborne powder. These compositions also often require a high phosphate content to exhibit acceptable flame retardant characteristics.

In view of the foregoing, what is needed is a flame retardant composition that can be blended with a thermoplastic resin to produce a flame retarded thermoplastic composition that is more environmentally acceptable, has high flame retardant characteristics, does not have components that migrate to the surface of the polymer requires less loading of the phosphate material so as to make it more economically attractive than other thermoplastic compositions available on the market today. The halogen-free or substantially halogen-free flame retardant composition and the resulting flame retarded thermoplastic composition of the present invention possesses these characteristics as well as others and therefore overcome the problems associated with the flame retardant compositions described in the prior art.

SUMMARY OF INVENTION

The present invention relates to a halogen-free or substantially halogen-free flame retardant composition comprising: (i) at least one a high charring polymer, (ii) at least one low volatility phosphate ester and (iii) at least one compound which splits off a high volatility phosphorus-containing fragment.

The present invention also relates to flame retarded thermoplastic compositions comprising an effective amount of the above-described flame retardant blend and at least one thermoplastic polymer, preferably, a polystyrene resin.

In accordance with the present invention, the thermoplastic compositions demonstrate high flame retardance as a result of the incorporation therein of at least one low volatility phosphate ester, at least one high volatility compound and at least one high charring material. Another advantage of the present invention is that the low volatility phosphate ester and the high volatility phosphorous-based components do not migrate to the surface of the polymer to any appreciable degree. The highly charring polymer or blend of high charring polymers provides a separate phase for better dissolving of the phosphorous containing additives and also provides a synergistic flame retardant effect with the phosphorous containing additives.

Another advantage of the flame retardant blend of the present invention is that the blend has a consistency that is easily blendable and processable with targeted thermoplastic resins. Still another advantage of the flame retardant blend of the present invention is the fact that the high volatility compound (iii) remains in the composition and does not evaporate off during processing leading to additional flame retardant characteristics.

Additional details and advantages of the invention are further described below.

DETAILED DESCRIPTION OF THE INVENTION

The present invention relates to a halogen-free or substantially halogen-free mechanically blended flame retardant composition. In particular, the invention relates to a flame-retardant composition comprising, a blend of (i) at least one high charring polymer, (ii) at least one low volatility phosphate ester, and (iii) at least one compound which splits off a high volatility phosphorus-containing fragment. The present invention also relates to a flame retarded thermoplastic composition comprising an effective amount of the blended flame retardant of the present invention and at least one thermoplastic polymer such as a polystyrene resin, preferably a high impact polystyrene (HIPS).

The term "thermoplastic polymer", used herein, is intended to include any organic polymeric material which can be reprocessed and reshaped at the temperature above its softening or melting point. Thermoplastic polymers may be processed by extrusion or injection-molding techniques, but, however, are not limited to these two techniques. Examples of such thermoplastic polymers are polyethylene, polypropylene, HIPS, ABS, thermoplastic polyesters, nylons, polycarbonate, and various blends therein.

The term "high impact polystyrene, HIPS", as used herein, is intended to include any polymeric thermoplastic material composed of the blend of general purpose polystyrene

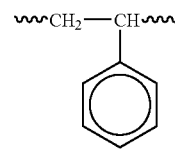

with various elastomers such as butadiene. Sometimes elastomers are graft-copolymerized or copolymerized with polystyrene instead of simple blending.

The term "highly charring polymer" is intended to include those polymers that contain benzene or heteroatomic rings in the main polymer backbone and that tend to produce a significant amount of char upon thermal decomposition. Typical commercial examples of such polymers are phenol-formaldehyde resins (including different types of substituted phenols and diphenols), polycarbonates, polyphenylenethers, polyimides, polysulfones, polyethersulfones, polyphenylene sulfides, polyetheretherketones etc. Of particular interest to this invention is polyphenylene ether (PPE) of general formula

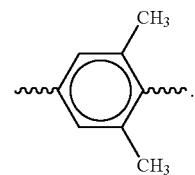

It is noted that this polymer is not melt-processable alone but is melt-processable when blended with other meltable polymer like HIPS. The term "mechanical blend" or "blend" is intended to include all types of non-concentrate compositions, namely blends, mixtures, co-mixtures, composites, compositions and the like.

The low volatility phosphate esters (ii) used in this invention are oligomeric phosphates of the general formula:

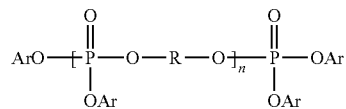

where R is a linear, branched or cyclic $C_2$ to $C_{15}$ alkylene group, phenylene, or bisphenylene with an alkylene, ether or sulfone bridge, Ar is an unsubstituted or substituted phenyl group, and where n can range from about 1 to about 10. Representative examples of the low volatility phosphate esters (ii) used in the practice of the present invention include resorcinol bis(diphenyl phosphate) (such as, Fyrol RDP available from Supresta, LLC), bisphenol A bis(diphenyl phosphate) (such as, Fyrol BDP also available from Supresta, LLC) and hydroquinone bis(diphenyl phosphate). Additional examples of low volatility phosphate esters that can be used in the present invention are described in U.S. Pat. Nos. 4,203,888, 4,212,832, 5,457,221, and 5,750,756, PCT International Patent Publication No. WO 97/31 980 and European Patent Publication No. 791,634 each of which is incorporated herein by reference.

The phosphorus-containing component (iii) that during heating decomposes and splits off a high volatility phosphorus-containing fragment should not contain any highly reactive groups, such as phosphoric acid functionalities, since highly reactive groups will prevent volatilization of the fragment. Examples of the phosphorous-containing component that will decompose to split off a high volatility phosphorus-containing fragment are metal salts of alkyl alkylphosphonic acid, where the alkyl groups are lower alkyl of 1-5 carbon atoms, branched or straight chain. These salts tend to regenerate dialkyl alkylphosphonate during thermal decomposition and therefore do not contain highly reactive groups that prevent volatilization of the fragment. Instead, the dialkyl alkylphosphonate quickly volatilizes into the flame.

The metal salts of alkyl alkylphosphonic acid used in the present invention can be synthesized by reacting dialkyl alkylphosphonates with strong base, e.g. NaOH, KOH etc., followed by substitution of the alkali metal with at least one metal selected from Groups II, III and IV of the Periodic Table or at least one transitional metal using a metal salt of the metal used in the substitution. The salts used in the present invention can also be synthesized by directly reacting an alkyl alkylphosphonic acid with a salt of the metal selected from Groups II, III and IV of the Periodic Table or of at least one transitional metal. Examples of suitable dialkyl alkylphosphonates that can be reacted to form the alkyl alkylphosphonic acid of the present invention (component (iii)) include but are not limited to dimethyl methylphosphonate (DMMP), dimethyl ethylphosphonate, dimethyl propylphosphonate, dimethyl butylphosphonate, diethyl methylphosphonate, diethyl ethylphosphonate, diethyl propylphosphonate, diethyl butylphosphonate and the like. Examples of suitable alkyl alkylphosphonic acids that can be used to produce metal salts that will split off a high volatility fragment are methyl methylphosphonic acid, methyl ethylphosphonic acid, methyl propylphosphonic acid, methyl butylphosphonic acid, ethyl methylphosphonic, ethyl ethylphosphonic acid, ethyl propylphosphonic, ethyl butylphosphonic acid and the like. Suitable metals within the metal salt component (iii) of the present invention include Mg, Ca, Sr, Ba, Zn, Al, Fe, Ni, Cr, Ti and Zr. Metals having a low atomic number are preferred since salts containing these metals will contain a higher phosphorus concentration by weight than salts having metals with higher atomic numbers. Examples of preferable metals are Mg, Ca, Zn, Al, and Ti. A preferred metal salt within component (iii) used in the practice of the present invention is a metal salt of methyl methylphosphonic acid, preferably aluminum methyl methylphosphonic acid.

The flame retarded thermoplastic composition of the present invention has superior flame retardant characteristics and physical properties over composition not containing at least one volatile compound, at least one low volatile compound at least one highly charring compound and at least one thermoplastic resin. In other words, the combination of the above-described components produces a thermoplastic composition wherein the components do not migrate to the surface, have a high heat distortion temperature (HDT ° C., as shown in Table 1), and requires less loading of the flame retardant in the resin to arrive at an UL-94 rating of V-0 (as seen when comparing the data from Example 1 to the data of Example 6 as set forth in Table 1). As an added feature the compounds of the present invention also do not contain halogens and therefore are more ecologically friendly.

The present invention is also directed to a process for manufacturing a mechanically blended flame retardant composition comprising (i) at least one high charring polymer, (ii) at least one low volatility phosphate ester and (iii) at least one compound which splits off a high volatility phosphorus-containing fragment. The process of the present invention blends (i) at least high charring polymer with (ii) at least one low volatility phosphate ester and (iii) at least one compound which splits off a high volatility phosphorus-containing fragment at a temperature below the normal melting point of the high charring polymer (i) to produce a mixture. The resulting mixture is a freely flowing powder producing low amounts of dust when handled. Since the amount of dust produced from the resulting mixture is low, and dust of finely dispersed charring agent can be explosive, the mixture is relatively safe to handle and is not explosive.

A portion of the mechanically blended flame retardant mixture produced is combined with at least one thermoplastic resin, preferable a polystyrene resin, to produce a flame retarded thermoplastic composition. The flame retarded thermoplastic composition of the present invention may contain about 20 percent to about 50 percent by weight of the blended flame retardant mixture.

In one embodiment of the invention, the halogen-free or substantially halogen-free flame retardant composition is provided by dry blending components (i) at least one high charring polymer, (ii) at least one low volatility phosphate ester and (iii) at least one compound which splits off a high volatility phosphorus-containing fragment together to provide a flame retardant dry-blended composition. The dry-blended flame retardant composition can be blended directly with a thermoplastic component to provide a flame retarded thermoplastic composition of the present invention. The basic operation of mixing can be carried out in a planetary mixer. The planetary movement of the mixer/agitator provides very intensive, quick, homogeneous mixing and was free of dead-spots. The dry-blended flame retardant composition is relatively dust-free thereby reducing the risk of explosion normally associated with the handling of airborne powders. Alternatively, the dry-blended flame retardant composition can be blended with the thermoplastic component in an extruder.

The flame retardant composition of the present invention comprises about 30% to about 70% by weight of the (i) highly charring polymer. The flame retardant composition may also comprise about 20% to about 50% by weight of the (ii) low volatility phosphate ester. In addition, the flame retardant composition may comprise about 5% to about 30% by weight of the (iii) compound that when subjected to heat, splits off a high volatility phosphorus-containing fragment. Once this mechanically blended flame retardant mixture is produced, about 10% to about 50% of this mixture can be blended with at least one thermoplastic compound, preferably a (iv) polystyrene resin, to produce a flame retarded thermoplastic composition of the present invention. Preferably, about 20% to about 40% of the mixture can be blended with the (iv) polystyrene resin to produce the thermoplastic styrene containing composition of the present invention.

The flame retardant composition of the present invention can also contain one or more additives that can be selected from the group consisting of compatibilizers, impact modifiers, anti-oxidants, drip suppressers, colorants, reinforcing agents, anti-drip agents, dispersants, toughening agents, processing aid additives, charring catalysts, and additional flame retardants.

The high charring polymer (i) used in the process for manufacturing a flame retardant is selected from the group consisting of phenol-formaldehyde resins, substituted phenols, substituted diphenols, polycarbonates, polyphenylene ethers, polyimides, polysulfones, polyether sulfones, polyphenylene sulfides, polyether ketones, and mixtures thereof. The high charring polymer (i) used in the process can be a polyphenylene ether (PPE) and the low volatility phosphate ester (ii) has the general formula:

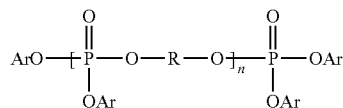

where R is a linear, branched or cyclic $C_2$ to $C_{15}$ alkylene group, phenylene, or bisphenylene with an alkylene, ether or sulfone bridge, Ar is an unsubstituted or substituted phenyl group, and where n can range from about 1 to about 10.

Representative of component (iii) which splits off a high volatility component is a metal salt of an alkyl alkylphosphonic acid. This metal salt is thermally stable at the normal melt processing temperature of the thermoplastic polymers, but decomposes at a temperature above 300° C. Once the metal salt decomposes at a temperature above 300° C. it produces a dialkyl alkylphosphonate that is highly volatile. Component (iii) can be a metal salt of alkyl alkylphosphonic acid wherein the metal is a metal taken from Groups II, II and IV the Periodic Table or transitional metals of the Periodic Table. The alkyl alkylphosphonic acids used to produce the salt preferably comprise lower alkyl groups, and typically contain 1 to 5 carbon atoms, branched or straight chain, for example methyl methylphosphonic acid. The polystyrene resin (iv) that can be mixed with a portion of the flame retardant composition described above to produce a flame retarded thermoplastic composition can be a high impact polystyrene (HIPS). Optionally, the compositions of the present invention can also contain poly(tetrafluoroethylene) (PTFE), a compound which prevents the formation of flaming drips during polymer combustion.

The process for manufacturing a flame retardant composition described above uses enough high charring polymer (i) to produce a flame retardant composition comprising about 5 percent to about 35 percent by weight of the high charring polymer (i). The process for manufacturing a flame retardant composition described above may also use enough low volatility phosphate (ii) to produce a flame retardant comprising about 5 percent to about 35 percent by weight of the low volatility phosphate (ii). The process for manufacturing a flame retardant composition described above may also use enough compound (iii) which splits off a high volatility phosphorus-containing fragment to produce a flame retardant composition comprising about 2 percent to about 15 percent by weight of the compound (iii). The flame retardant composition comprising various amounts of high charring polymer, low and high volatility components can then be blended with one or more thermoplastic resins to produce thermoplastic flame retarded compositions of the present invention.

In order to illustrate various illustrative embodiments of the present inventions, the following examples are provided.

EXAMPLES

Comparative Example 1

A powder of polyphenylene ether (PPE), BHPP 820 brand from General Electric, was fed into the cold throat of a co-rotating twin-screw extruder at the rate of 22 g/min. An aromatic oligomeric phosphate resorcinol bis(diphenyl phosphate), Fyrolflex RDP, brand from Supresta LLC, was pumped into the third heating zone of the extruder at the rate of 22 g/min. The extruder temperature profile of four zones was 220, 240, 250 and 250 C. The resultant concentrate exited the die of the extruder in the form of a molten strain, which was then cooled under water and pelletized. After drying the concentrate with the ratio PPE:RDP of 1:1 was ready for addition to the styrene copolymer.

Comparative Example 2

Example 1 was repeated adding the polyphenylene ether powder at the rate of 44 g/min instead of 22 g/min. The concentrate with the ratio of PPE:RDP=2:1 was manufactured.

Comparative Example 3

Example 1 was repeated using a blend of bisphenol A bis(phenylphosphate), Fyrolflex BDP and dimethyl methylphosphonate, Fyrol DMMP, both brand names of Supresta LLC, at the ratio of 2:1 instead of Fyrolflex RDP, which was pumped into the third heating zone of the extruder. The blend was pumped with the rate of 22 g/min, whereas polyphenylene ether was fed with the rate of 11 g/min. The temperature profile of the four heating zones of the extruder were 150, 180, 200 and 170 C. Relatively low temperature at the first zone (150° C.) and in the die (170°) minimizes volatilization of DMMP. Normally non-processable PPO can be extruded and pelletized in the presence of BDP/DMMP blend at the maximum temperature of the extrusion (third zone) 200° C. The concentrate with the ratio of PPE:BDP:DMMP=2:2:1 was manufactured.

Comparative Example 4

Example 3 was repeated using a blend of Fyrolflex RDP and isopropylated triphenyl phosphate ester (Phosflex 31 available from Supresta, LLC), instead of a blend of Fyrolflex BDP and Fyrol DMMP. The blend of Fyrolflex RDP and Phosflex 31 at the ratio of 1.75:1 was pumped into the third heating zone of the extruder. The blend was pumped with the rate of 22 g/min, whereas polyphenylene ether was fed at a rate of 28 g/min. A blend having a ratio of PPE:RDP:Phosflex 31=3.5:1.75:1 was manufactured.

Example 5

An aluminum salt of methyl methylphosphonic acid was synthesized according to the U.S. Pat. No. 4,666,967, herein incorporated in its entirety by reference. The resulting aluminum salt was subjected to the thermogravimetry (TGA) analysis and the resulting gases analyzed by infrared (FTIR). The main gaseous product split off of the aluminum salt was dimethyl methylphosphonate (DMMP) evolving from 270° C. to 360° C. with maximum evolution rate at about 335° C.

Example 6

A 1.5 kg dry-blend flame retardant composition of the present invention was prepared by mixing 250.5 grams of finely milled Al salt of methyl methylphosphonic acid having an median particle size of 40 microns with 834 grams PPE resin (Blendex HPP820, brand of General Electric). The two materials were dry blended using a flat blade agitator. After pre-blending was complete, 415.5 grams of Fyrolflex RDP was slowly added with agitation until the Fyrolflex RDP was completely absorbed by the pre-blend. Agitation was continued until a uniform free flowing blend was achieved. The basic operation of mixing was carried out in a planetary mixer. The planetary movement of the mixer provides very intensive, quick, homogeneous mixing and was free of dead spots. The obtained dry mix blend was dust free.

Example 7

Example 6 was repeated except 7.5 g poly(tetrafluoroethylene), (PTFE) Teflon 6C, (available from Du Pont®) was added to the mixture before blending. Adding PTFE to the composition as a co-additive aids in preventing flaming drips from being released from the burning polymer.

Example 8

Example 7 was repeated, however hydroquinone bis (diphenyl phosphate) was used instead of Fyrolflex RDP. Hydroquinone bis(diphenyl phosphate) was prepared according to known procedures.

Example 9

Example 7 was repeated, however bisphenol A bis(diphenyl phosphate), (Fyrolflex BDP) was used instead of Fyrolflex RDP.

Example 10

High impact polystyrene (HIPS), Styron 478 brand name of Dow Chemicals, was dry pre-mixed with the concentrates prepared in Comparative Examples 1-4 and with the blends prepared in Examples 6-9. The mixture was processed in a twin-screw extruder and injection molded at the conditions typical for HIPS plastics. Flammability of the extruded bars of ⅛ inch thickness was measured according to the UL-94 protocol (vertical setup), which is described by J. Troitzsch, International Plastics Flammability Handbook, $3^{rd}$ edition, Hanser Publishers, Munich, 2004. Tensile strength of the molded specimens was measured according to D638 ASTM standard, Izod impact strength according to D256 ASTM standard and heat distortion temperature (HDT) at a thickness of ⅛ inch and force of 66 psi according to D648 ASTM standard. Results of the tests are listed in the Table 1.

As can be seen from above, Examples 6-9 use PPE as the high charring component, resorcinol bis(diphenyl phosphate) (such as, Fyrolflex RDP available from Supresta), bisphenol A bis(diphenyl phosphate) (such as, Fyrolflex BDP also available from Supresta) and hydroquinone bis(diphenyl phosphate) as the low volatility component, aluminum salt of methyl methylphosphonic acid as the high volatility compound, and HIPS to make the flame retarded thermoplastic composition of the present invention. Comparative Examples 1 and 2 produce thermoplastic compounds taught in the prior art comprising PPE, Fyrolflex RDP, and polystyrene resin but do not use any compounds that split off a high volatility phosphorous containing component. Comparative Example 3 produces thermoplastic compounds having good flame retardant performance, low heat distortion temperature (HDT). Comparative Example 4 uses DMMP to produce the thermoplastic material taught in the prior art. The DMMP used tends to partially volatilize during compounding and due to its toxicity makes the compounds dangerous to handle. The resulting composition produced in Example 4 has good flame retardant performance, but low HDT. In addition, the compounds produced in Example 4, contain low molecular weight phosphate, namely isopropylated triphenyl phosphate ester (Phosflex 31 available from Supresta, LLC), and therefore run the risk of the low weight phosphate migrating to the surface of the composition.

Comparably, the compositions produced in Examples 6-9, have a higher HDT than the composition produced in Example 1, even though the Example 6-9 compositions contain less loading of the flame retardant composition in the resin than the prior art composition of example 1. Therefore, the flame retardant composition and the resulting thermoplastic material produced when blended with a thermoplastic resin, namely a polystyrene resin of the present invention, demonstrates superior unexpected results compared to compounds not containing at least one high charring compound, at least one low volatility compound, and at least one high volatility compound as described herein. The fact that the flame retarded thermoplastic composition of the present invention provides higher HDT values and the same UL-94 rating of V-0 than compounds in the prior art that actually have a higher weight percent of flame retardant material, makes the present invention more economically feasible than the compositions described in the prior art. In addition, the fact that the flame retardant compositions and the resulting thermoplastic compounds are either free of or substantially free of halogens makes the compositions of the present invention more environmentally safe than halogen containing compositions taught in the prior art.

While the preferred embodiment of the present invention has been illustrated and described in detail, various modifications of, for example, components, materials and parameters, will become apparent to those skilled in the art, and all such modifications and changes are intended to fall within the scope of the claims of the present invention.

TABLE 1

| Flame Retardant | Comp. Ex. 1 | Comp. Ex. 2 | Comp. Ex. 3 | Comp. Ex. 4 | Ex. 6 | Ex. 7 | Ex. 8 | Ex. 9 |
| --- | --- | --- | --- | --- | --- | --- | --- | --- |
| Loading in the resin, wt. % | 40 | 30 | 25 | 30 | 30 | 30 | 30 | 30 |
| UL-94 rating | V-0 | V-1 | V-0 | V-0 | V-0 | V-0 | V-1 | V-1 |
| Tensile strength, psi | 3700 | 4600 | 5100 | 3200 | 3500 | 4400 | 4250 | 4700 |
| Izod impact strength, ft lb/in | 1.2 | 1.3 | 0.8 | 1.3 | 0.8 | 1.1 | 0.9 | 0.9 |
| HDT, ° C. | 64 | 79 | 59 | 68 | 75 | 82 | 84 | 87 |

What is claimed is:

1. A halogen-free or substantially halogen-free flame retardant composition comprising a blend of (i) at least one highly charring polymer, (ii) at least one low volatility phosphate ester and (iii) at least one compound which splits off a high volatility phosphorus-containing fragment.

2. The composition according to claim 1, wherein said (i) at least one highly charring polymer is selected from the group consisting of phenol-formaldehyde resins, substituted phenols, substituted diphenols, polycarbonates, polyphenylene ethers, polyimides, polysulfones, polyether sulfones, polyphenylene sulfides, polyether ketones, and mixtures thereof.

3. The composition according to claim 1, wherein said (i) at least one highly charring polymer is polyphenylene ether.

4. A flame retarded thermoplastic composition comprising an effective amount of the flame retardant composition of claim 3 and an effective amount of (iv) at least one polystyrene resin.

5. The composition according to claim 1, wherein (ii) at least one low volatility phosphate ester has the general formula:

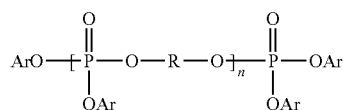

where R is a linear, branched or cyclic $C_2$ to $C_{15}$ alkylene group, phenylene, or bisphenylene with an alkylene, ether or sulfone bridge, Ar is an unsubstituted or substituted phenyl group, and where n can range from about 1 to about 10.

6. The composition according to claim 5, wherein said (ii) at least one low volatility phosphate ester is selected from the group consisting of resorcinol bis(diphenyl phosphate), bisphenol A bis(diphenyl phosphate), hydroquinone bis(diphenyl phosphate) and mixtures thereof.

7. A flame retarded thermoplastic composition comprising an effective amount of the flame retardant composition of claim 6.

8. A flame retarded thermoplastic composition comprising an effective amount of the flame retardant composition of claim 5.

9. The composition according to claim 1, wherein said (iii) at least one compound which splits off a high volatility phosphorus-containing fragment is a metal salt of an alkyl alkylphosphonic acid.

10. The composition according to claim 9, wherein said metal salt of alkyl alkylphosphonic acid is a metal salt of an alkyl alkylphosphonic acid, said alkyl groups having 1-5 carbon atoms, branched or straight chain, wherein the metals are selected from Groups II, III, or IV of the Periodic Table or transition metals.

11. The composition according to claim 9, wherein said (iii) at least one compound which splits off a high volatility phosphorus-containing fragment is a metal salt of an alkyl alkylphosphonic acid wherein the metal is selected from the group consisting of Mg, Ca, Zn, Al, Ti and Zr.

12. The composition according to claim 11, wherein the metal salt of alkyl alkylphosphonic acid is an aluminum salt of methyl methylphosphonic acid.

13. The composition according to claim 1, wherein said (iii) at least one compound which splits off a high volatility phosphorus-containing fragment, splits off said high volatility phosphorous-containing fragment at a temperature above about 300° C.

14. The process for manufacturing the flame retarded thermoplastic composition according to claim 13 wherein said (i) at least one low volatility phosphate ester has the general formula:

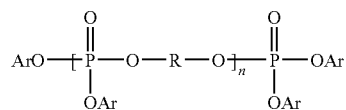

where R is a linear, branched or cyclic $C_2$ to $C_{15}$ alkylene group, phenylene, or bisphenylene with an alkylene, ether or sulfone bridge, Ar is an unsubstituted or substituted phenyl group, and where n can range from about 1 to about 10.

15. The composition according to claim 1, wherein said composition comprises about 5 percent to about 35 percent by weight of said (iii) at least one compound which splits off a high volatility phosphorus-containing fragment.

16. The composition according to claim 15, wherein said composition comprises about 2 percent to about 15 percent by weight of said (iii) at least one compound which splits off a high volatility phosphorus-containing fragment.

17. The composition according to claim 1 further comprising poly(tetrafluoroethylene).

18. A flame retarded thermoplastic composition comprising an effective amount of the flame retardant composition of claim 1.

19. The composition according to claim 1 further comprising a polystyrene resin.

20. The composition according to claim 19 wherein the polystyrene resin is high impact polystyrene.

21. A process for manufacturing a halogen free or substantially halogen-free flame retardant composition, said process comprising blending together (i) at least one highly charring polymer, (ii) at least one low volatility phosphate ester and (iii) at least one compound which splits off a high volatility phosphorus-containing fragment.

22. A process for manufacturing a flame retarded thermoplastic composition comprising blending (iv) at least one polystyrene resin with the blended flame retardant composition of claim 21.

23. The process for manufacturing the flame retarded thermoplastic composition according to claim 22 wherein a sufficient amount of said flame retardant composition is mixed with a sufficient amount of said (iv) at least one polystyrene resin to provide a flame retarded thermoplastic composition comprising about 20 percent to about 50 percent by weight of said flame retardant composition.

24. The process for manufacturing the flame retarded thermoplastic composition according to claim 22 wherein a sufficient amount of said flame retardant composition is blended with a sufficient amount of said (iv) at least one polystyrene resin to produce a flame retarded thermoplastic composition comprising about 20 percent to about 35 percent by weight of said flame retardant composition.

25. The process for manufacturing the flame retarded thermoplastic composition according to claim 22 wherein said (i) at least one highly charring polymer is selected from the group consisting of phenol-formaldehyde resins, substituted phenols, substituted diphenols, polycarbonates, polyphenylene ethers, polyimides, polysulfones, polyether sulfones, polyphenylene sulfides, polyether ketones, and mixtures thereof.

26. The process for manufacturing the flame retarded thermoplastic composition according to claim 22 wherein said (i) at least one highly charring polymer is polyphenylene ether.

27. The process for manufacturing the flame retarded thermoplastic composition according to claim 22 wherein said (ii) at least one low volatility phosphate ester is resorcinol bis(diphenyl phosphate), bisphenol A bis(diphenyl phosphate), hydroquinone bis(diphenyl phosphate) and mixtures thereof.

28. The process for manufacturing the flame retarded thermoplastic composition according to claim 22 wherein said (iii) at least one compound which splits off a high volatility phosphorus-containing fragment is a metal salt of an alkyl alkylphosphonic acid, said alkyl groups having 1 to 5 carbon atoms, branched or straight chain, wherein the metal is selected from Groups II, III, or IV of the Periodic Table or transition metals.

29. The process for manufacturing the flame retarded thermoplastic composition according to claim 22, wherein said (iii) at least one component which splits off a high volatility phosphorus-containing fragment is a metal salt of an alkyl alkylphosphonic acid wherein the metal is selected from the group consisting of Mg, Ca, Zn, Al, Ti and Zr.

30. The process for manufacturing the flame retarded thermoplastic composition according to claim 29 wherein said metal salt of alkyl alkylphosphonic acid is an aluminum salt of methyl methylphosphonic acid.

31. The process for manufacturing the flame retarded thermoplastic composition according to claim 22 wherein said (iii) at least one compound which splits off a high volatility phosphorus containing fragment splits off said high volatility phosphorous-containing fragment at a temperature above about 300° C.

32. The process for manufacturing a flame retarded thermoplastic composition according to claim 21 wherein poly(tetrafluoroethylene) is blended with the blended flame retardant composition.

* * * * *